United States Patent
Tefend

(10) Patent No.: US 11,987,455 B2
(45) Date of Patent: May 21, 2024

(54) SORTATION CONVEYOR WITH FLEXIBLE DIVERT GUIDE

(71) Applicant: TREW, LLC, Fairfield, OH (US)

(72) Inventor: Matthew J. Tefend, Columbus, OH (US)

(73) Assignee: Trew, LLC, Fairfield, OH (US)

(*) Notice: Subject to any disclaimer, the term of this patent is extended or adjusted under 35 U.S.C. 154(b) by 0 days.

(21) Appl. No.: 17/891,683

(22) Filed: Aug. 19, 2022

(65) Prior Publication Data
US 2023/0057690 A1 Feb. 23, 2023

Related U.S. Application Data

(60) Provisional application No. 63/234,830, filed on Aug. 19, 2021.

(51) Int. Cl.
*B65G 47/82* (2006.01)

(52) U.S. Cl.
CPC .................... *B65G 47/82* (2013.01)

(58) Field of Classification Search
CPC ...................................... B65G 47/82
USPC .................................... 198/370.07
See application file for complete search history.

(56) References Cited

U.S. PATENT DOCUMENTS

| | | | |
|---|---|---|---|
| 5,027,939 A | 7/1991 | Kilper et al. | |
| 5,131,522 A * | 7/1992 | Fujio | B65G 47/844 198/370.02 |
| 6,390,274 B1 * | 5/2002 | Snedecor | B65G 17/005 198/370.02 |
| 7,516,835 B2 | 4/2009 | Neiser et al. | |
| 7,549,527 B2 | 6/2009 | Neiser et al. | |
| 8,371,431 B2 | 2/2013 | Neiser et al. | |
| 8,727,096 B2 * | 5/2014 | Schroader | B65G 47/844 198/370.01 |
| 8,757,353 B2 | 6/2014 | Neiser et al. | |
| 10,926,963 B1 | 2/2021 | Saurber, III et al. | |
| 2009/0139834 A1 | 6/2009 | Brayman et al. | |
| 2011/0042181 A1 | 2/2011 | Steenwyk et al. | |
| 2013/0140138 A1 | 6/2013 | Neiser et al. | |
| 2014/0360838 A1 | 12/2014 | Wilkins et al. | |
| 2019/0016539 A1 * | 1/2019 | Maines | B65G 47/46 |

OTHER PUBLICATIONS

International Search Report and Written Opinion dated Nov. 15, 2022 for Application No. PCT/US22/40865, 12 pages.

* cited by examiner

*Primary Examiner* — James R Bidwell
(74) *Attorney, Agent, or Firm* — Frost Brown Todd LLP

(57) ABSTRACT

A sortation conveyor includes a conveying surface extending in a longitudinal direction and configured to carry an article along a conveying path. The sortation conveyor also includes a pusher element configured to be selectively diverted transversely relative to the longitudinal direction for engaging and diverting the article away from the conveying path. The sortation conveyor further includes a flexible divert guide including at least one compressible member configured to transition between an uncompressed state and a compressed state.

22 Claims, 13 Drawing Sheets

SORTATION CONVEYOR WITH FLEXIBLE DIVERT GUIDE

PRIORITY

This application claims the benefit of U.S. Pat. App. No. 63/234,830, entitled "Sortation Conveyor with Flexible Divert Guide," filed Aug. 19, 2021, the disclosure of which is incorporated by reference herein.

BACKGROUND

The present disclosure relates to sortation conveyors, also known as sorters, for use with high volume distribution and fulfillment operations. A sortation conveyor system typically comprises a first conveying surface moving in a downstream longitudinal direction, defining a first conveying path, which conveys articles carried thereon. One or more divert conveyors, also known as diverts, branch conveyors, or spurs, extend transversely at divert locations from either side of the first conveying surface. Sortation conveyors can selectively divert the conveyed articles from the first conveying path to a divert conveying path by employing a plurality of pusher elements that travel laterally (transverse to the longitudinal direction of travel of the first conveying path) along a divert track to divert articles being carried along the first conveying path to the divert conveying path. Described herein is a flexible divert guide for use with a divert track of a sortation conveyor to gently engage and gradually accelerate conveyed articles laterally onto the divert conveying path for improved control of diverted articles.

BRIEF DESCRIPTION OF THE DRAWINGS

The accompanying drawings illustrate embodiments which serve to explain the principles of the present innovation.

Figure 1:
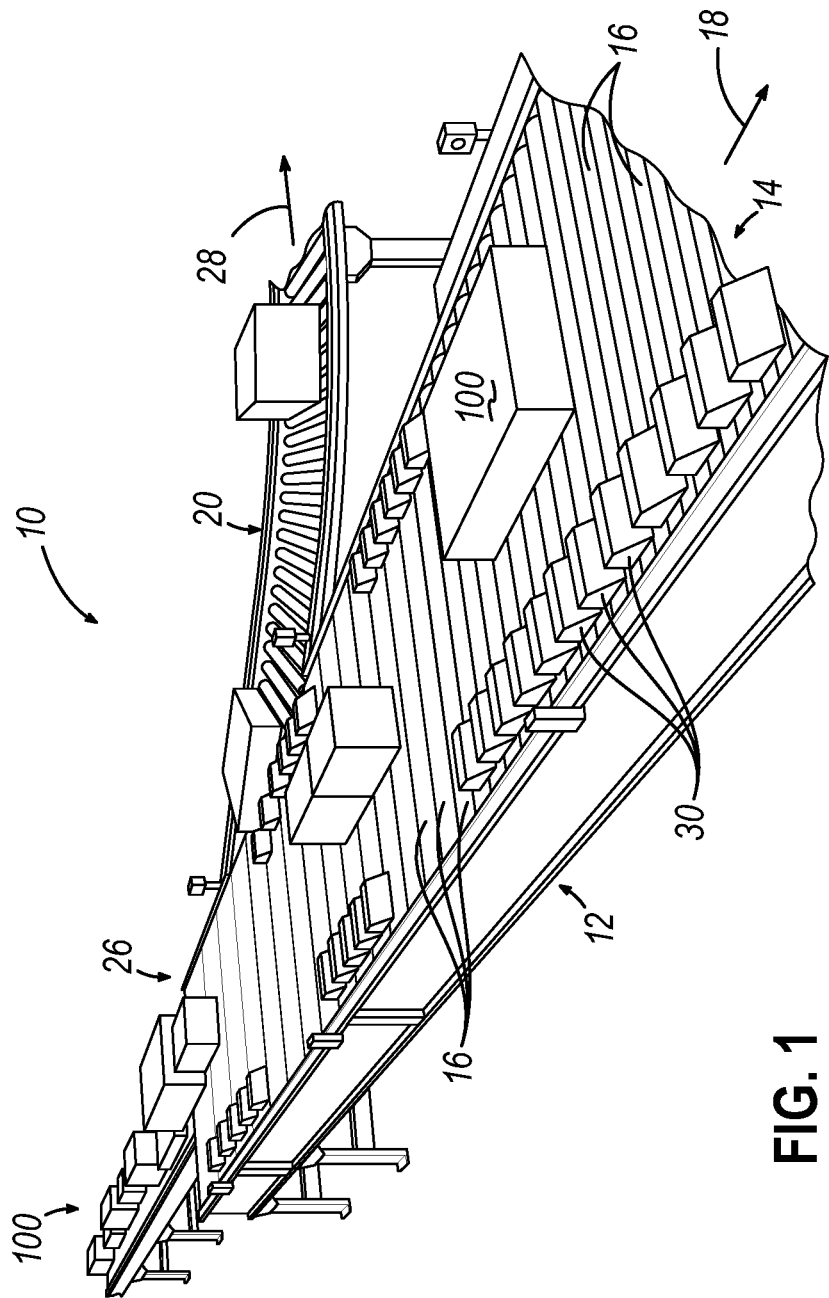
FIG. 1 is an isometric view of a portion of a sortation conveyor.

The drawings are not intended to be limiting in any way, and it is contemplated that various embodiments of the innovation may be carried out in a variety of other ways, including those not necessarily depicted in the drawings. The accompanying drawings incorporated in and forming a part of the specification illustrate several aspects of the present innovation, and together with the description serve to explain the principles of the innovation; it being understood, however, that this innovation is not limited to the precise arrangements shown.

DETAILED DESCRIPTION

The following description of certain examples of the innovation should not be used to limit the scope of the present innovation. Other examples, features, aspects, embodiments, and advantages of the innovation will become apparent to those skilled in the art from the following description, which is by way of illustration, one of the best modes contemplated for carrying out the innovation. As will be realized, the innovation is capable of other different and obvious aspects, all without departing from the innovation. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following described teachings, expressions, embodiments, examples, etc. should therefore not be viewed in isolation relative to each other.

Various suitable ways in which the teachings herein may be combined will be readily apparent to those of ordinary skill in the art in view of the teachings herein. Such modifications and variations are intended to be included within the scope of the claims.

For clarity of disclosure, spatial terms such as "upstream," "downstream," "upper," "outer," "inner," and "below," are used herein for reference to relative positions and directions. Such terms are used below with reference to views as illustrated for clarity and are not intended to limit the innovation described herein.

Furthermore, the terms "about," "approximately," and the like as used herein in connection with any numerical values or ranges of values are intended to encompass the exact value(s) referenced as well as a suitable tolerance that enables the referenced feature or combination of features to function for the intended purpose described herein.

The word "exemplary" is used herein to mean "serving as an example, instance, or illustration." Any implementation described herein as "exemplary" is not necessarily to be construed as preferred or advantageous over other implementations.

A sortation conveyor is configured to sequentially transport and selectively divert one or more articles (e.g., packages, cartons, boxes, etc.) from a first conveying path of the sortation conveyor to a divert conveying path that branches relative to the first conveying path. A plurality of pusher elements are selectively moveable laterally across the first conveying path along a divert track to divert selected articles from the first conveying path to the divert conveying path. A flexible divert guide comprising a compressible portion is positioned upstream of the divert track to gently engage and gradually accelerate the pusher elements, and thereby conveyed articles, laterally onto the divert track. This may improve the control of pusher elements and/or the stability of transferring the conveyed article to the divert conveying path, which may result in a higher percentage of articles being successfully diverted.

As used herein in connection with a divert guide or portion thereof, the term "flexible" refers to an ability of the divert guide or portion thereof to undergo a deformation, such as a change in size and/or shape, such that at least a portion of a first surface of the divert guide (e.g., the surface of the divert guide that engages the pusher elements) deflects relative to one or more other surfaces of the divert guide from an undeflected position to a deflected position in response to application of a threshold force to the first surface (e.g., by a pusher element); the term "compressible" refers to an ability of the divert guide or portion thereof to undergo a reduction in size in response to application of the threshold force to the first surface (e.g., notwithstanding the presence of tensile regions in the divert guide or portion thereof); and the terms "elastic" and "resilient" refer to an ability of the divert guide or portion thereof to automatically return to its original size and/or shape such that at least the deflected portion of the first surface of the divert guide (e.g., the surface of the divert guide that engages the pusher elements) returns to the undeflected position in response to removal of the threshold force.

I. Exemplary Sortation Conveyor with Flexible Divert Guide

Figure 2:
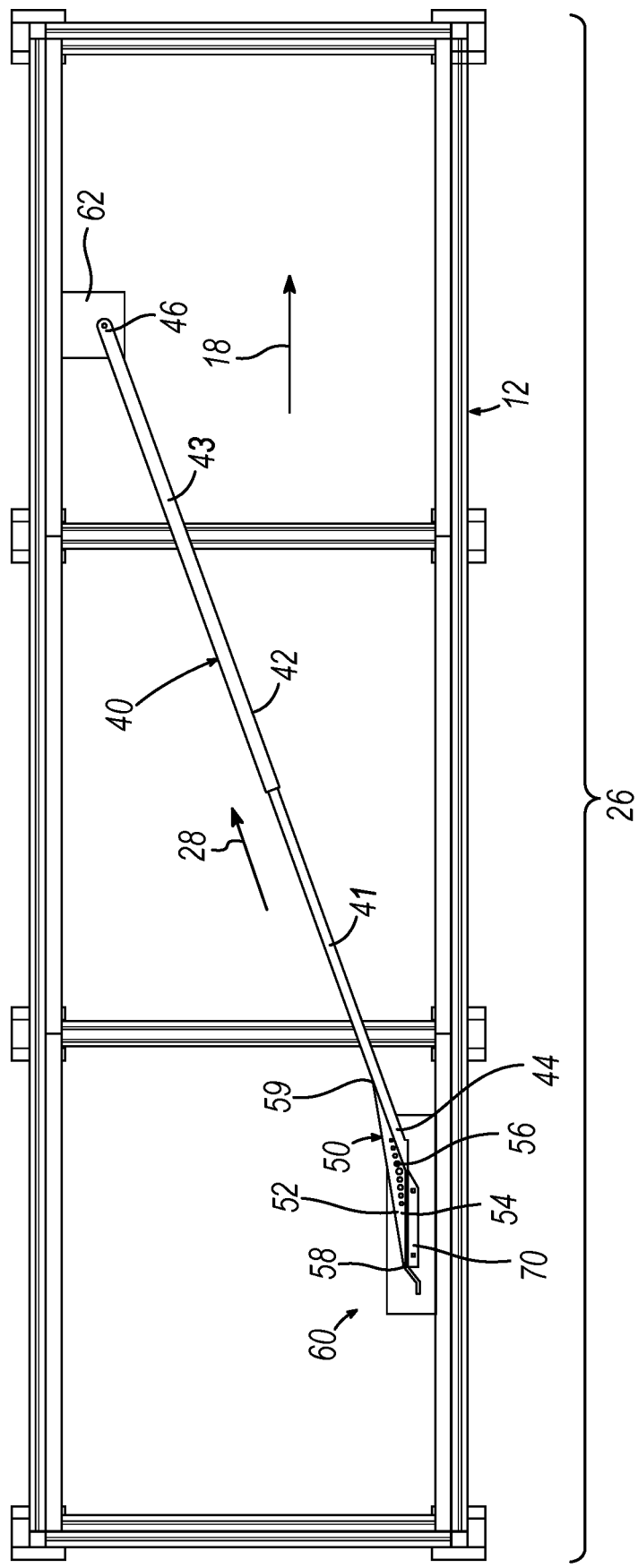
FIG. 2 is a top plan view of a portion of the sortation conveyor of FIG. 1 with a conveying surface and pusher elements omitted to show an exemplary flexible divert guide and divert track.

FIGS. 1-2 show a sortation conveyor 10 for transporting a plurality of articles 100. Sortation conveyor 10 comprises a first conveying surface 14 and a divert 20 extending transversely relative to first conveying surface 14 at a divert location 26. In the illustrated version, first conveying surface 14 defines a first conveying path 18 extending longitudinally along first conveying surface 14. First conveying surface 14 comprises laterally extending members 16 supported by a frame 12 that are advanced in the downstream longitudinal direction of first conveying path 18. FIG. 1 depicts laterally extending members 16 as tubes or slats, which are generally parallel to each other, but any other suitable configuration for members 16 can be used to convey articles 100 along sortation conveyor 10. Divert 20 defines a divert conveying path 28 extending transversely relative to first conveying path 18.

Sortation conveyor 10 is configured to selectively divert articles 100 from first conveying path 18 of first conveying surface 14 to the divert conveying path 28 of divert 20. To divert articles 100, first conveying surface 14 carries a plurality of pusher elements 30 which may travel laterally (transverse to the longitudinal direction of travel of first conveying surface 14), guided by a divert track 40 (see FIG. 2) underlying the upper surface of first conveying surface 14. For instance, if a particular article 100 is selected to continue travelling along first conveying path 18, pusher elements 30 continue to travel along first conveying path 18 along a side of first conveying surface 14. If a particular article 100 is selected to be diverted at divert location 26 to divert conveying path 28, selected pusher elements 30 are diverted to travel laterally across first conveying surface 14 to engage and divert the selected article 100 onto divert 20. While FIG. 1 shows sortation conveyor 10 having one divert location 26, it should be noted that sortation conveyor 10 can include any suitable number of divert locations 26, extending to either side of sortation conveyor 10. Divert 20 may be any configuration suitable to receive articles 100, such as a powered or non-powered conveyor, a chute, a hopper, a bag or a bin.

FIG. 2 is a top plan view of a portion of sortation conveyor 10, showing divert location 26 of sortation conveyor 10, with members 16 and pusher elements 30 omitted so as to show divert track 40 and an exemplary flexible divert guide 50. Divert track 40 is configured to guide pusher elements 30 from first conveying surface 14 to divert 20. Divert track 40 of the illustrated version comprises a straight section 42 extending between an upstream end 44 and a downstream end 46, though any other suitable configurations can be used. In the illustrated version, straight section 42 comprises a first rail 41 and second rail 43 that are slidingly coupled together in a telescopic configuration to allow first and second rails 41, 43 to translate relative to each other. This allows a length and/or angle of straight section 42 to be adjustable when first and second rails 41, 43 are translated relative to each other. Upstream end 44 is coupled with flexible divert guide 50 at support 60 of frame 12. Downstream end 46 is coupled with a return 62 that is configured to guide pusher elements 30 along the other side portion of first conveying surface 24 after pusher elements 30 have been diverted. In some versions, a flexible divert guide 50 can also be coupled with downstream end 46 to help guide pusher elements 30 to return 62. While the illustrated version shows divert track 40 having a straight section 42, divert track 40 may be of any suitable configuration. In some versions, divert track 40 includes an arcuate section. Divert track 40 can be rigid and/or sufficiently flexible to divert selective pusher elements 30. For instance, divert track 40 can include a flexible portion extending along a portion or an entire length of divert track 40. In some versions, flexible divert guide 50 can be extended to form a portion or an entire length of divert track 40.

Figure 3:
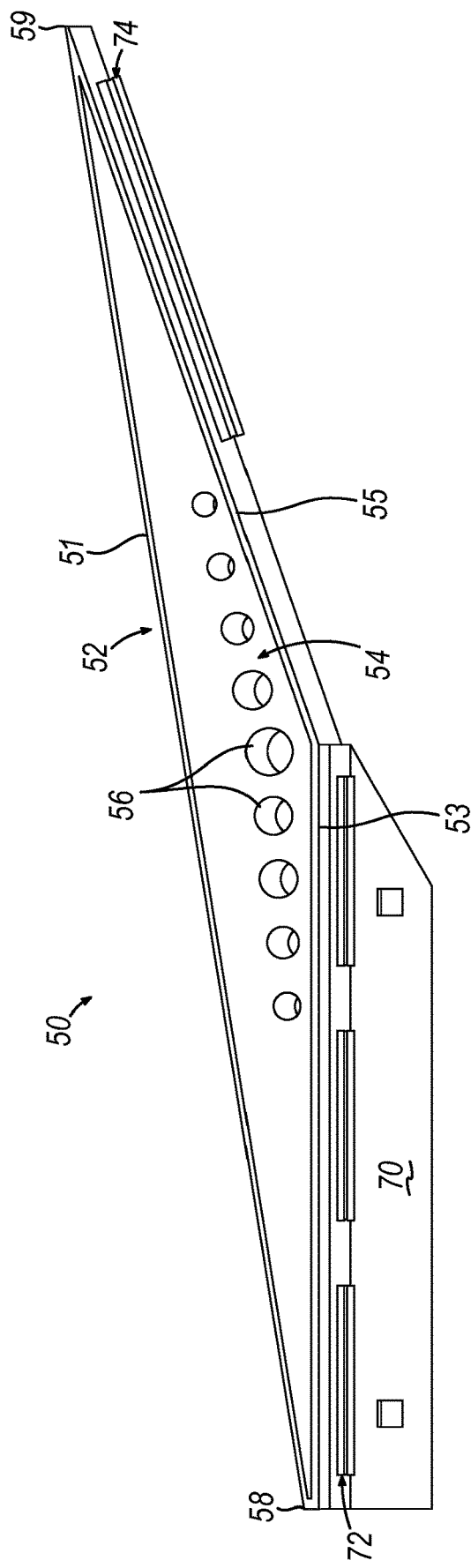
FIG. 3 is a top plan view of the flexible divert guide of FIG. 2.

Referring to FIGS. 2-3, flexible divert guide 50 is couplable with divert track 40 at upstream end 44 of divert track 40 and/or downstream end 46 of divert track 40. Flexible divert guide 50 is configured to receive pusher elements 30 to thereby guide pusher elements 30 to divert track 40 and/or the spent location. Flexible divert guide 50 is flexible in a direction normal to the force from a pusher element 30 such that flexible divert guide 50 is configured to engage pusher element 30 without an abrupt force. This may allow pusher element 30 to maintain control of article 100 to inhibit article from toppling when article 100 is diverted. In the illustrated version, flexible divert guide 50 comprises a generally triangular body defining a first surface 51, a second surface 53, and a third surface 55, though any other suitable shape can be used to guide pusher elements 30 to divert track 40 without an abrupt force. First surface 51 extends from an upstream end 58 to a downstream end 59 of flexible divert guide 50 and is configured to engage pusher elements 30 (see FIG. 1), such that first surface 51 may also be referred to as a pusher engagement surface. Second surface 53 comprises one or more mounting tabs 72 that are configured to couple flexible divert guide 50 with support 60 via bracket 70. Third surface 55 comprises one or more mounting tabs 74 that are configured to couple flexible divert guide 50 with upstream end 44 of divert track 40. While the illustrated version shows first surface 51 being straight, first surface 51 may be of any suitable configuration. In some versions, first surface 51 is curved. For example, first surface 51 may be configured in accordance with any one or more teachings of U.S. Pat. App. No. 63/234,830, entitled "Sortation Conveyor with Flexible Divert Guide," filed Aug. 19, 2021.

Figure 6:
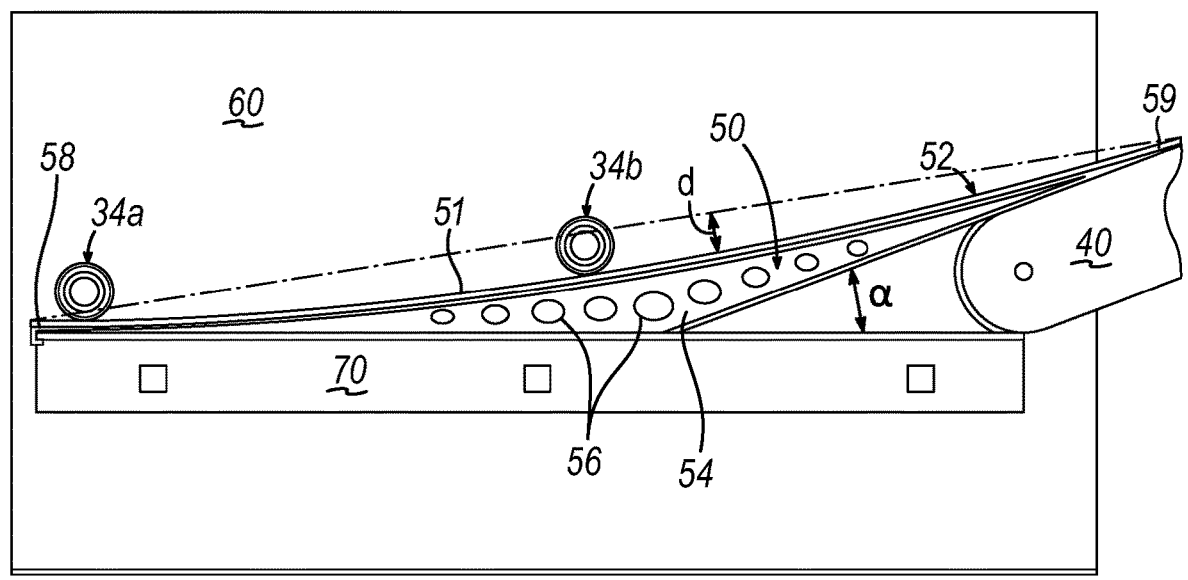
FIG. 6 is an enlarged partial top plan view of the portion of the sortation conveyor of FIG. 5 with a laterally extending member of the conveying surface removed, showing a plurality of pusher elements engaged with the flexible divert guide.

Flexible divert guide 50 further comprises a compressible portion, such as defined by outer core 52 and inner core 54. As shown in FIGS. 3 and 6, inner core 54 is positioned within the outer core 52 such that the outer core 52 encompasses inner core 54. Outer core 52 and inner core 54 can each be made from a resilient or elastic material, such as a hyperelastic material having a non-linear stiffness (e.g., santoprene, rubber, etc.) or any other suitable composite non-rigid material. In some versions, the stiffness of flexible divert guide 50 can be optimized for each use based on the various articles 100 being conveyed for such use. Outer core 52 and inner core 54 can be made from the same material and/or different materials such that outer core 52 and inner core 54 can have similar and/or different stiffnesses. In some versions, inner core 54 can be filled with air and/or water within outer core 52 to form a compressible bladder. Outer core 52 can be more resistant to wear to protect inner core 54 from forces due to compression from pusher elements 30. Inner core 52 of the illustrated version comprises one or more openings 56 that allow inner core 54 to be more compressible than an inner core 54 without openings 56, but openings 56 are optional. Moreover, the illustrated version shows openings 56 as extending through inner core 54. In some other versions, openings 56 comprise void areas that extend through only a portion of inner core 54. Still other suitable configurations for openings 56 will be apparent to one with ordinary skill in the art in view of the teachings herein.

The compressible portion of flexible divert guide 50, such as outer and/or inner cores 52, 54, is configured such that first surface 51 of flexible divert guide is configured to deflect inward toward second and/or third surfaces 53, 55 when a pusher element 30 exerts a force against first surface 51 as pusher element 30 moves along first surface 51. First surface 51 of flexible divert guide 50 is then resiliently biased towards its original position by outer and/or inner cores 52, 54 to exert a force in a direction normal to the force from pusher element 30. The compressible portion of flexible divert guide 50 thereby provides a dynamically flexible path along first surface 51 that is self-adjusting in response to pusher element 30. For instance, the compression of the material of flexible divert guide 50 can result in a change to the path of pusher element 30 such that such path is dynamic due to the various weights of articles 100 being conveyed. Accordingly, a pusher element 30 guiding an article 100 having a larger weight can deflect flexible divert guide 50 more than a pusher element 30 guiding an article 100 having a smaller weight. Once a pusher element 30 has travelled along flexible divert guide 50, flexible divert guide 50 is self-adjusting such that flexible divert guide 50 can sufficiently return to its original shape and/or position. For instance, the material of flexible divert guide 50 can be sufficiently resilient to return flexible divert guide 50 to its original position, and/or a mechanical device (e.g., a spring) can be used to sufficiently return flexible divert guide 50 to its original position.

Accordingly, the compressible portion of flexible divert guide 50 is configured to improve the stability of diverting an article 100 from first conveying path 18 to divert conveying path 28. For instance, the diverting action of a pusher element 30 against an article 100 is a collision event that can be described by the impulse-momentum change principle:

Impulse=Change in Momentum or $I = \Delta p$ where

Impulse=Force*Time or $I = F*T$ and

Change in Momentum=Mass*Change in Velocity or $\Delta p = m*\Delta v$

To improve the stability of the collision event, it is desired that flexible divert guide 50 be constructed such that a reduction of the initial contact force between pusher element 30 and article 100 is achieved. The reduction of force for this process can mathematically be expressed as:

$$F * T = m * \Delta v$$

$$F = \frac{m * \Delta v}{T}$$

Accordingly, the compressibility of flexible divert guide 50 is configured to minimize the change of velocity variable ($\Delta v$) and/or to maximize the time (T) variable to thereby improve the stability of the collision event relative to a rigid or fixed divert track 40. In some versions, flexible divert guide 50 is adjustable to optimize the stability of transferring article 100 to divert conveying path 28. For instance, the length, thickness, and/or stiffness of flexible divert guide 50 can be adjusted depending on the speed of the sortation conveyor 10 and/or the weight of article 100.

Figure 4:
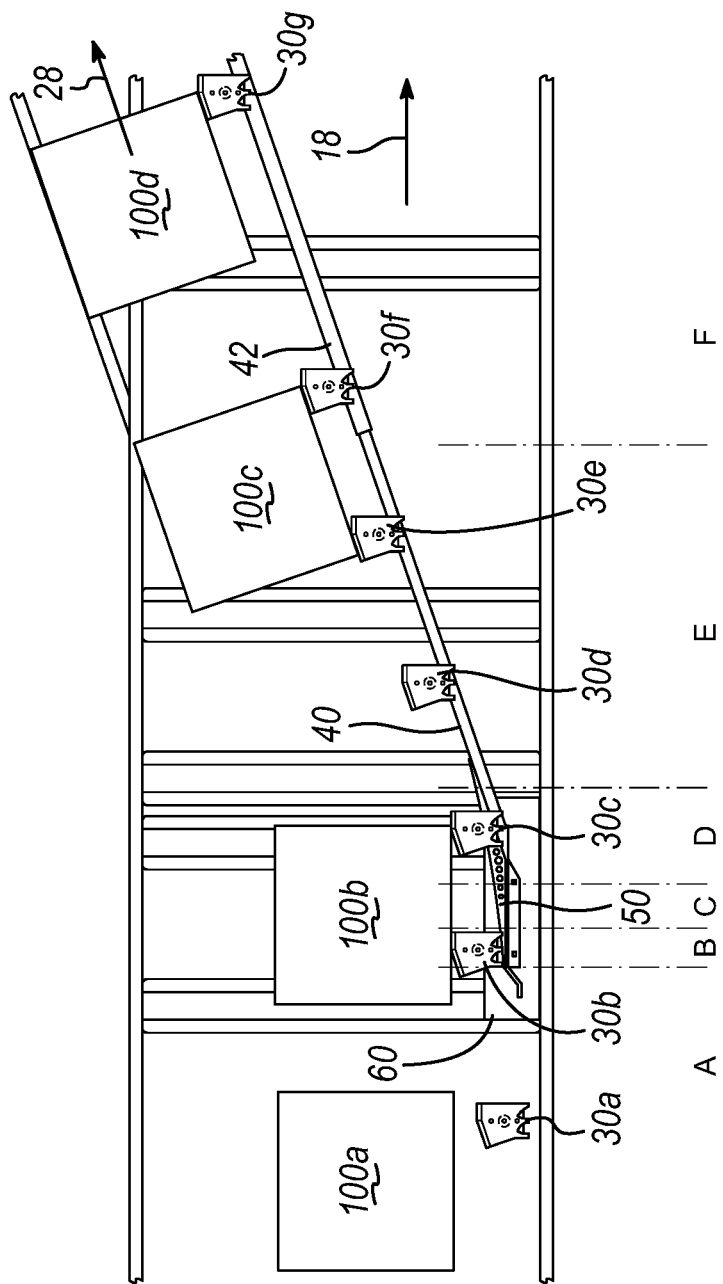
FIG. 4 is a top plan view of the portion of a sortation conveyor of FIG. 1 with the conveying surface omitted, showing the pusher elements diverting a plurality of articles.

FIG. 4 shows a plurality of pusher elements 30*a-g* illustrated at various locations along first conveying path 18 and along divert conveying path 28. Some pusher elements 30 have been omitted for clarity. Pusher element 30*a* is illustrated traveling along first conveying path 18 following first conveying surface 14. Unless diverted, pusher element 30*a* will continue traveling along first conveying path 18 downstream of flexible divert guide 50 and divert track 40. Pusher element 30*b* is being diverted and is illustrated at upstream end 58 of flexible divert guide 50. Pusher element 30*c* has also been diverted and is illustrated entering divert track 40 at downstream end 59 of flexible divert guide 50. Pusher elements 30c-30g are traveling along divert track 40. Accordingly, articles 100b, 100c, 100d are illustrated as being diverted toward divert 20.

Figure 5:
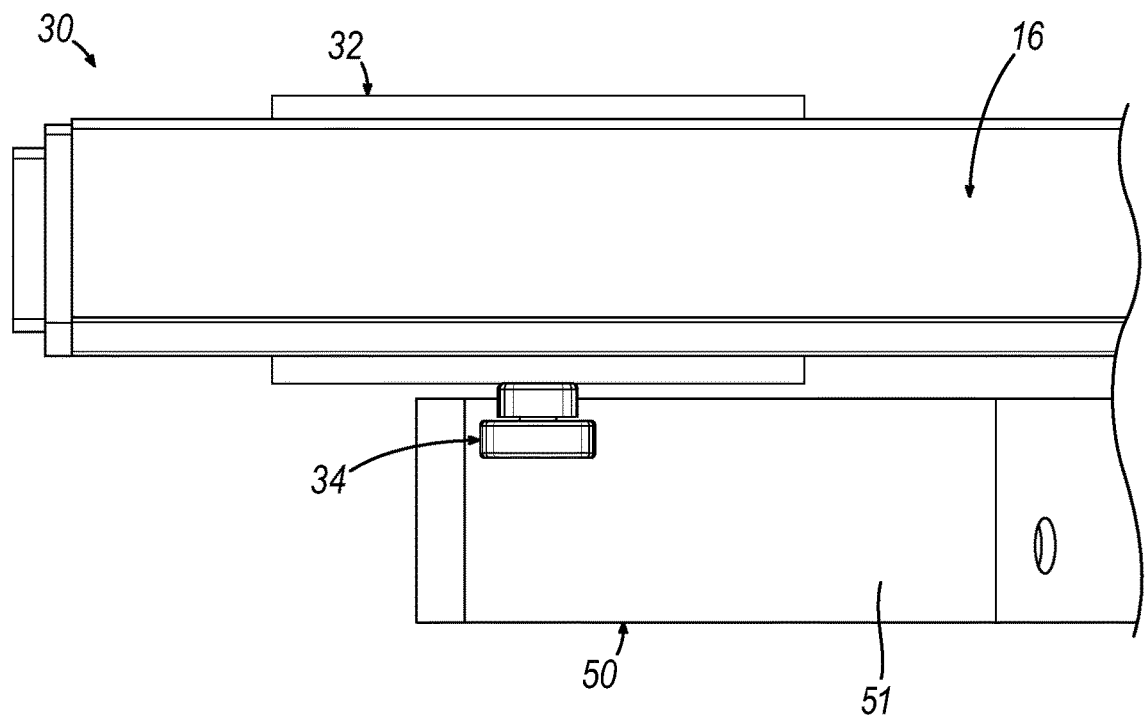
FIG. 5 is an enlarged partial end view of the portion of the sortation conveyor of FIG. 4, showing a pusher element engaged with the flexible divert guide.
Figure 8:
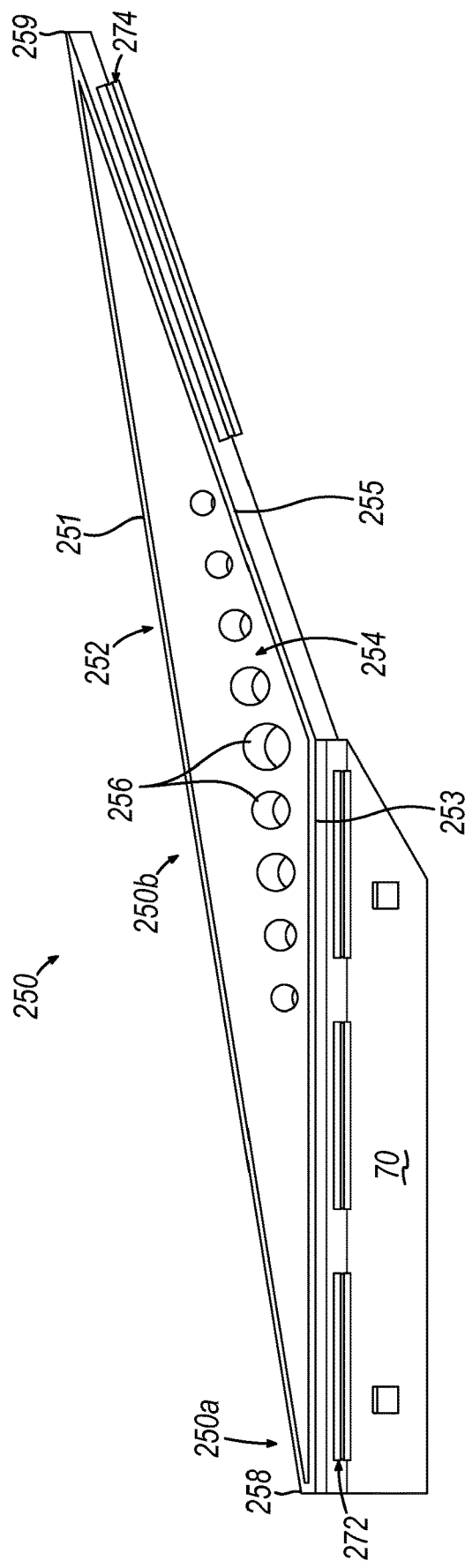
FIG. 8 is a top plan view of another exemplary flexible divert guide for use with the sortation conveyor of FIG. 1.

Referring to FIGS. 5-6, pusher elements 30 that are selectively diverted to divert 20 engage flexible divert guide 50 prior to entering divert track 40. For instance, pusher element 30 includes a bearing 34 disposed below a base 32 of pusher element 30 such that bearing 34 is positioned below a member 16 of first conveying surface 14. Bearing 34 is configured to engage first surface 51 of flexible divert guide 50. For instance, as shown in FIG. 8, bearing 34a is illustrated as entering an upstream end 58 of flexible divert guide 50. Bearing 34b is illustrated as engaging first surface 51 of flexible divert guide 50 such that bearing 34b compresses outer and/or inner core 52, 54 of flexible divert guide 50 to thereby compress first surface 51 a distance d from its original position. Accordingly, flexible divert guide 50 defines a dynamic flexible path along first surface 51. The compression of flexible divert guide 50 allows flexible divert guide 50 to gently engage and gradually accelerate pusher elements 30, and thereby conveyed articles 100, laterally toward divert conveying path 28 such that flexible divert guide 50 engages bearing 35 of pusher element 30 without an abrupt force to maintain control of pusher element 30. Bearing 34b may then travel to downstream end 59 of flexible divert guide 50 and to divert track 40.

As shown in FIG. 6, third surface 55 of flexible divert guide 50 is oriented at an angle α relative to second surface 53. This angle α corresponds to an angle that divert track 40 is oriented relative to first conveying surface 14. Angle α can be adjusted based on the desired length for divert track 40. In the illustrated version, angle α is shown as about 20°, though any other suitable angle can be used, such as from about 20° to about 30°, for guiding pusher element 30 to divert track 40. In some versions, a support 64 having a wedge configuration can be positioned adjacent to third surface 55 of flexible divert guide 50 to support third surface 55. Support 64 can be made from a rigid and/or resilient material. Still other suitable configurations for flexible divert guide 50 will be apparent to one with ordinary skill in the art in view of the teachings herein.

Figure 7:
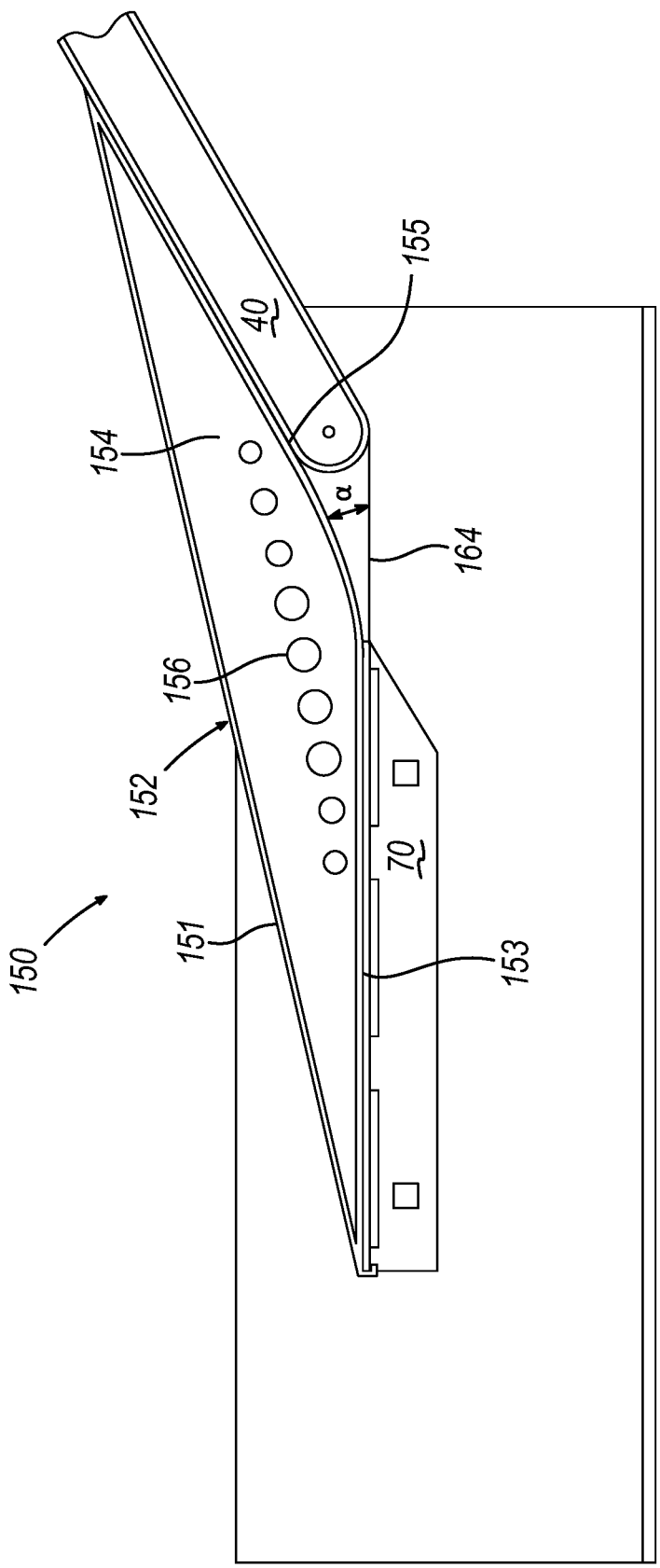
FIG. 7 is an enlarged partial top plan view of the portion of the sortation conveyor of FIG. 5 with the laterally extending member of the conveying surface removed, showing another exemplary flexible divert guide.

For instance, FIG. 7 shows another exemplary flexible divert guide 150 that is similar to flexible divert guide 50 described above. Flexible divert guide 150 comprises a resiliently compressible portion, such as defined by an inner core 154 positioned within an outer core 152. Outer core 152 and inner core 154 are each made from a resilient or elastic material, such as a hyperelastic material having a non-linear stiffness (e.g., santoprene, rubber, etc.). Inner core 152 of the illustrated version comprises one or more openings 156 that allow inner core 154 to be more compressible than an inner core 154 without openings 156, but openings 156 are optional. Third surface 155 of flexible divert guide 150 is oriented at an angle α relative to second surface 153. This angle α corresponds to an angle that divert track 40 is oriented relative to first conveying surface 14. Angle α can be adjusted based on the desired length for divert track 40. In the illustrated version, angle α is shown as about 30°, though any other suitable angle can be used, such as from about 20° to about 30°, for guiding pusher element 30 to divert track 40. In some versions, a support 164 having a wedge configuration can be positioned adjacent to third surface 155 of flexible divert guide 150 to support third surface 155. Support 164 can be made from a rigid and/or resilient material. While the illustrated version shows first surface (also referred to as a pusher engagement surface) 151 being straight when flexible divert guide 150 is in an uncompressed state, first surface 151 may be of any suitable configuration. In some versions, first surface 151 is curved when flexible divert guide 150 is in the uncompressed state.

Figure 9A:
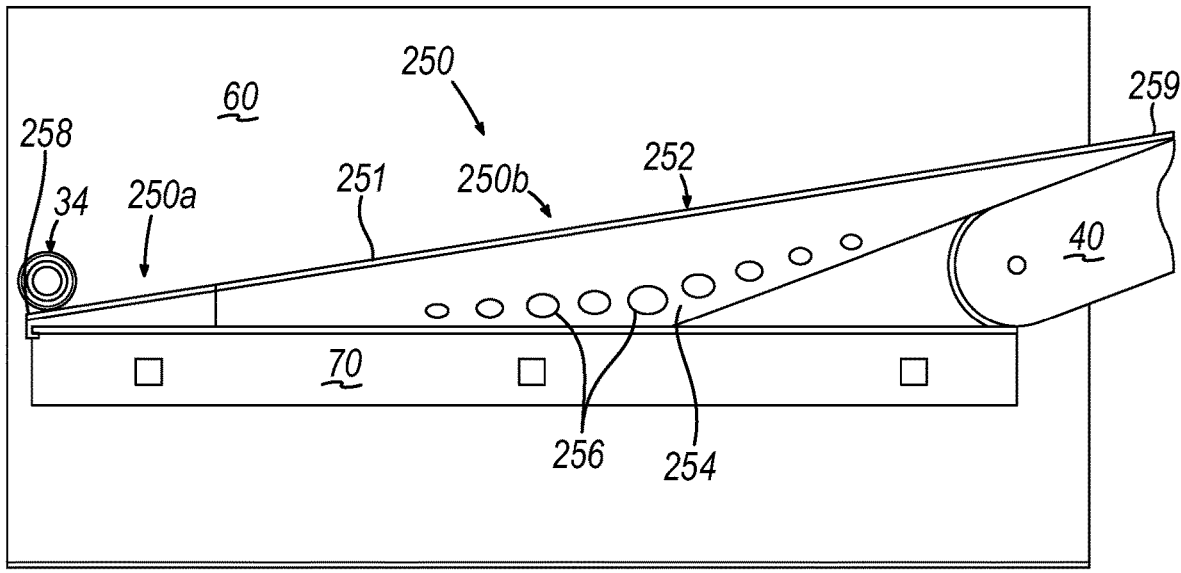
FIG. 9A is an enlarged partial top plan view of a portion of the sortation conveyor of FIG. 1 with a laterally extending member of the conveying surface removed, showing the flexible divert guide of FIG. 8 in an uncompressed state such that a pusher engagement surface of the flexible divert guide is in a straight configuration to begin guiding a pusher element along a linear path.
Figure 9B:
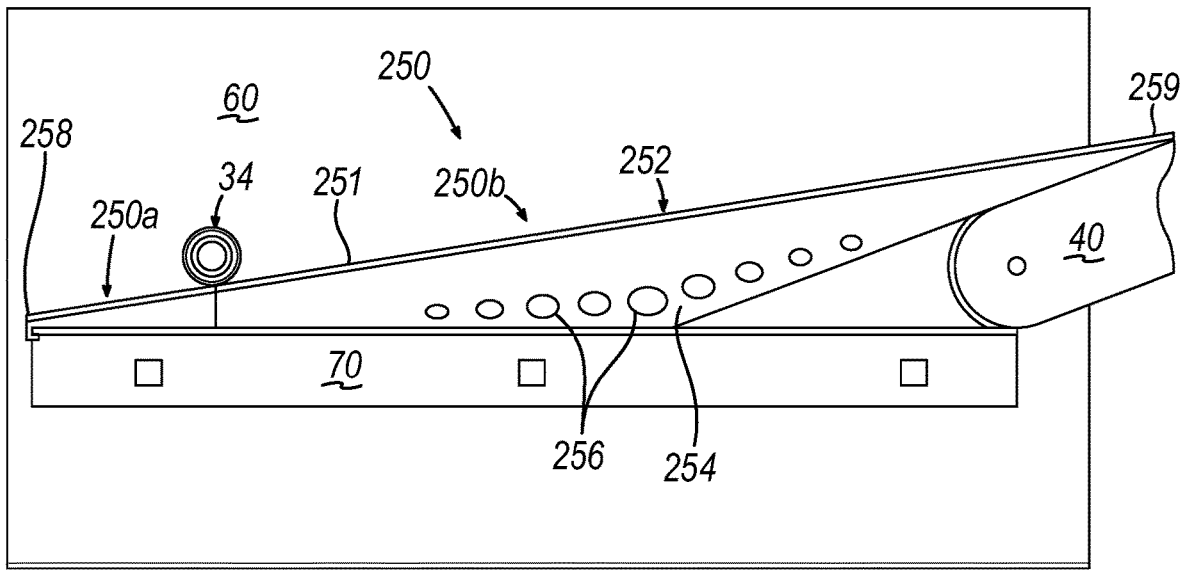
FIG. 9B is an enlarged partial top plan view of a portion of the sortation conveyor of FIG. 1 with the laterally extending member of the conveying surface removed, showing the flexible divert guide of FIG. 8 remaining in the uncompressed state such that the pusher engagement surface of the flexible divert guide remains in the straight configuration to continue guiding the pusher element along the linear path.
Figure 9C:
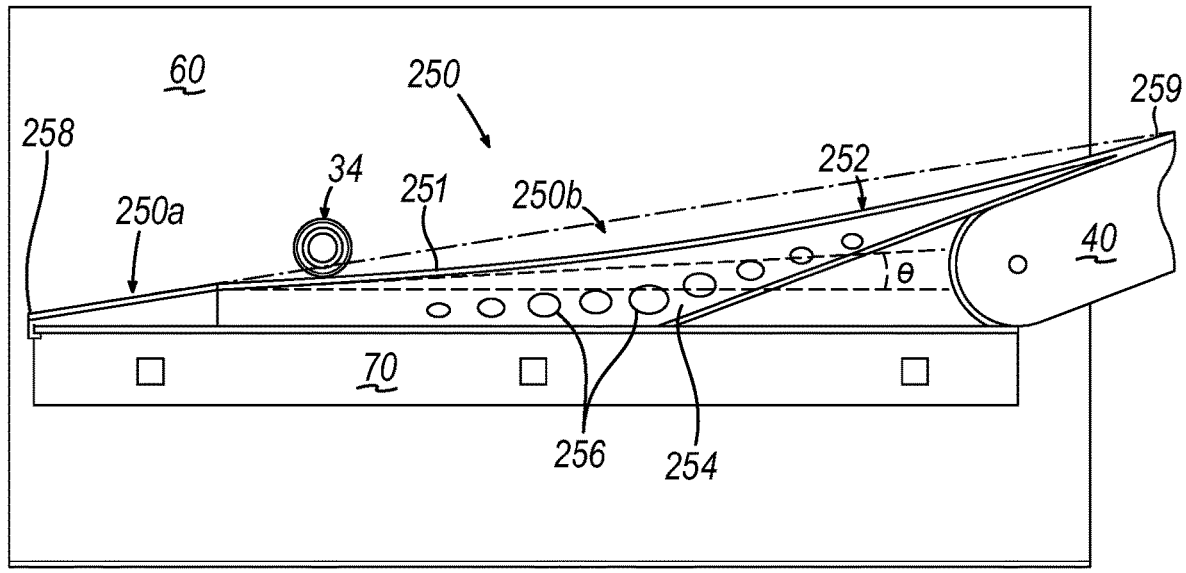
FIG. 9C is an enlarged partial top plan view of a portion of the sortation conveyor of FIG. 1 with the laterally extending member of the conveying surface removed, showing the flexible divert guide of FIG. 8 transition to a compressed state such that the pusher engagement surface of the flexible divert guide assumes a curved configuration to begin guiding the pusher element along a curved path.
Figure 9D:
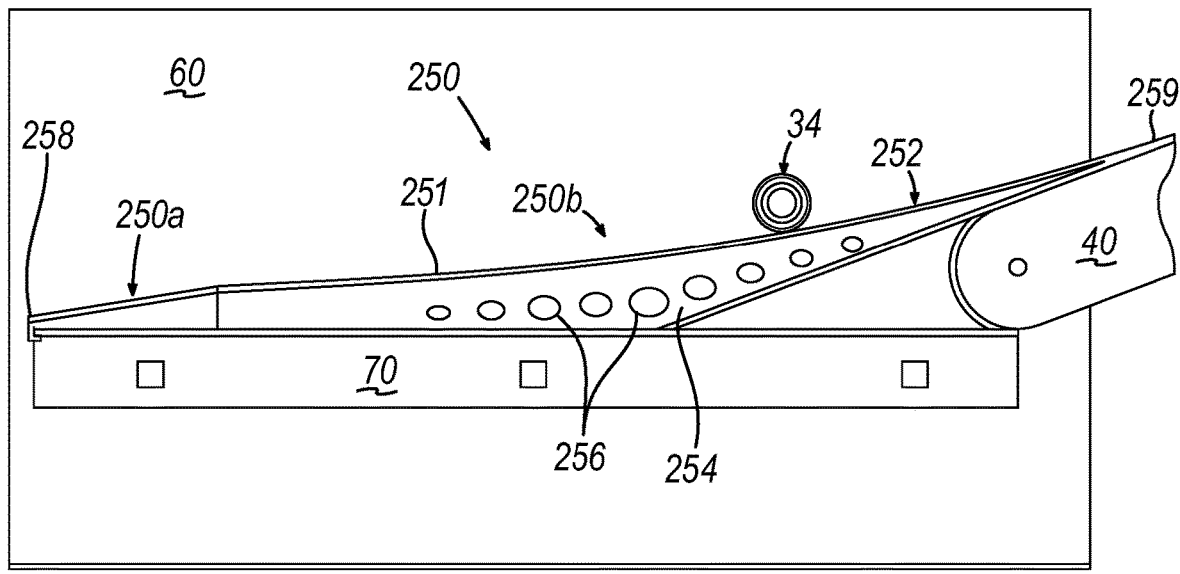
FIG. 9D is an enlarged partial top plan view of a portion of the sortation conveyor of FIG. 1 with the laterally extending member of the conveying surface removed, showing the flexible divert guide of FIG. 8 remaining in the compressed state such that the pusher engagement surface of the flexible divert guide remains in the curved configuration to continue guiding the pusher element along the curved path.

FIGS. 8-9D show another exemplary flexible divert guide 250 that may be similar to any one or more of flexible divert guides 50, 150 described above except as otherwise described below. In this regard, flexible divert guide 250 is couplable with divert track 40 at upstream end 44 of divert track 40 and/or downstream end 46 of divert track 40, and is configured to receive pusher elements 30 to thereby guide pusher elements 30 to divert track 40 and/or the spent location. In the illustrated version, flexible divert guide 250 comprises a generally triangular body defining a first surface 251, a second surface 253, and a third surface 255. First surface 251 extends from an upstream end 258 to a downstream end 259 of flexible divert guide 250 and is configured to engage pusher elements 30 (see FIG. 1), such that first surface 251 may also be referred to as a pusher engagement surface. Second surface 253 comprises one or more mounting tabs 272 that are configured to couple flexible divert guide 250 with support 60 via bracket 70. Third surface 255 comprises one or more mounting tabs 274 that are configured to couple flexible divert guide 50 with upstream end 44 of divert track 40.

Flexible divert guide 250 further comprises a resiliently compressible portion, such as defined by outer core 252 and inner core 254. In some versions, flexible divert guide 250 may have a varying stiffness. More particularly, the stiffness of flexible divert guide 250 may vary in the longitudinal direction. For example, an upstream region 250a of flexible divert guide 250 may have a relatively high stiffness while a downstream region 250b of flexible divert guide 250 may have a relatively low stiffness. In other words, upstream region 250a may have a first spring constant $k_1$ and downstream region 250b may have a second spring constant $k_2$ less than the first spring constant $k_1$. In this regard, outer core 252 and/or inner core 254 can be made from a composite material to provide upstream regions of outer core 252 and/or inner core 254 with the relatively high stiffness and to provide downstream regions of outer core 252 and/or inner core 254 with the relatively low stiffness. In some versions, upstream region 250a of flexible divert guide 250 may comprise ultra-high-molecular-weight polyethylene (UHMW). Inner core 252 of the illustrated version comprises one or more openings 256, which may be positioned at predetermined locations to contribute to the varying stiffness of flexible divert guide 250.

The compressible portion of flexible divert guide 250, such as outer and/or inner cores 252, 254, is configured such that first surface 251 of flexible divert guide 250 is configured to deflect inward toward second and/or third surfaces 253, 255 when a pusher element 30 exerts a threshold force against first surface 251 as pusher element 30 moves along first surface 251. More particularly, first surface 251 is configured to transition from a first, straight configuration corresponding to an uncompressed state of flexible divert guide 250 (FIGS. 9A-9B) to a second, curved configuration corresponding to a compressed state of flexible divert guide 250 (FIGS. 9C-9D) in response to the threshold force being exerted against first surface 251 by pusher element 30.

In some versions, the threshold force may be selected such that pusher element 30 is not capable of exerting the threshold force against first surface 251 until the pusher element 30 has contacted an article 100 being conveyed. For example, the force exerted against first surface 251 by the pusher element 30 prior to contacting an article 100 may be insufficient to transition first surface 251 from the straight configuration to the curved configuration.

In addition, or alternatively, the varying stiffness of flexible divert guide 250 may be tailored to inhibit first surface 251 from transitioning from the straight configuration to the curved configuration until the pusher element 30 reaches a predetermined location along first surface 251. For example, the varying stiffness of flexible divert guide 250 may be tailored to inhibit first surface 251 from transitioning from the straight configuration to the curved configuration until the pusher element 30 reaches a location along first surface 251 at which the pusher element 30 has already initially contacted an article 100. In some cases, this location may be positioned along downstream region 250b of flexible divert guide 250. To that end, the first spring constant k1 may be sufficiently large to inhibit first surface 251 from transitioning from the straight configuration to the curved configuration while pusher element 30 is being directed along upstream region 250a of flexible divert guide 250, and the second spring constant k2 may be sufficiently small to permit first surface 251 to transition from the straight configuration to the curved configuration while pusher element 30 is being directed along downstream region 250b of flexible divert guide 250.

Thus, flexible divert guide 250 may be configured to direct a pusher element 30 along a linear path defined by first surface 251 while in the straight configuration until the pusher element 30 has contacted an article 100, such as until the pusher element 30 has begun being directed along downstream region 250b of flexible divert guide 250; and may then be configured to direct the pusher element 30 along a curved path defined by first surface 251 while in the curved configuration to gradually accelerate the pusher element 30 and accompanying article 100 in the lateral direction after the initial contact between the pusher element 30 and the accompanying article 100 has occurred, such as while pusher element 30 is being directed along downstream region 250b of flexible divert guide 250.

It will be appreciated that the particular shape of first surface 251 while in the curved configuration may be dependent upon and/or responsive to the weight of the article 100 being diverted and one or both spring constants $k_1$, $k_2$. Likewise, the particular shape of the curved path may be dependent upon and/or responsive to the weight of the article 100 being diverted and one or both spring constants $k_1$, $k_2$. For example, a heavier article 100 may cause first surface 251 and the curved path defined thereby to have a relatively large radius of curvature when first surface 251 is in the curved configuration, while a lighter article 100 may cause first surface 251 and the curved path defined thereby to have a relatively small radius of curvature when first surface 251 is in the curved configuration; and a relatively small spring constant $k_1$, $k_2$ may cause first surface 251 and the curved path defined thereby to have a relatively large radius of curvature when first surface 251 is in the curved configuration, while a relatively large spring constant $k_1$, $k_2$ may cause first surface 251 and the curved path defined thereby to have a relatively small radius of curvature when first surface 251 is in the curved configuration. In some cases, one or both spring constants $k_1$, $k_2$ may be selected based on the weight of the article 100. For example, the second spring constant $k_2$ may be selected to permit first surface 251 to transition from the straight configuration to the curved configuration while pusher element 30 is being directed together with an accompanying article 100 along downstream region 250b of flexible divert guide 250.

As noted above, upstream region 250a of flexible divert guide 250 may have a relatively high stiffness while downstream region 250b of flexible divert guide 250 may have a relatively low stiffness, such that flexible divert guide 250 includes two regions having different stiffnesses from each other. In some versions, flexible divert guide 250 may include more than two regions having different stiffnesses from each other.

Referring now to FIGS. 9A-9D, an exemplary method of diverting a pusher element 30 to thereby divert an article 100 using flexible divert guide 250 is shown. A bearing 34 of the pusher element 30 may initially engage first surface 251 of flexible divert guide 250 at upstream region 250a of flexible divert guide 250 while flexible divert guide 250 is in the uncompressed state such that first surface 251 is in the straight configuration to thereby begin directing bearing 34 along a linear path, as shown in FIG. 9A.

Flexible divert guide 250 may remain in the uncompressed state such that first surface 251 remains in the straight configuration to thereby continue directing the bearing 34 along the straight path while the bearing 34 remains engaged with upstream region 250a of flexible divert guide 250, as shown in FIG. 9B. For example, first surface 251 may direct the bearing 34 along the straight path up to and including the moment at which pusher element 30 initially contacts an article 100.

Flexible divert guide 250 may transition to the compressed state such that first surface 251 assumes the curved configuration when bearing 34 reaches a predetermined location along first surface 251, such as downstream region 250b of flexible divert guide 250 to thereby begin directing the bearing 34 along a curved path, as shown in FIG. 9C. For example, first surface 251 may assume the curved configuration immediately after pusher element 30 contacts the article 100 in response to the pusher element 30 (e.g., together with the accompanying article 100) exerting the threshold force against first surface 251. As mentioned above, a varying stiffness of flexible divert guide 250 in the longitudinal direction may facilitate the transitioning of flexible divert guide 250 from the uncompressed state to the compressed state at the particular location shown in FIG. 9C. As also shown in FIG. 9C, the bearing 34 may enter the curved path at an angle $\theta$ relative to the longitudinal direction. In some versions, angle $\theta$ may be equal to or greater than about 20°.

Flexible divert guide 250 may remain in the compressed state such that first surface 251 remains in the curved configuration to thereby continue directing the bearing 34 along the curved path while the bearing 34 remains engaged with downstream region 250b of flexible divert guide 250, as shown in FIG. 9D. For example, first surface 251 may direct the bearing 34 along the curved path and onto divert track 40.

Figure 10:
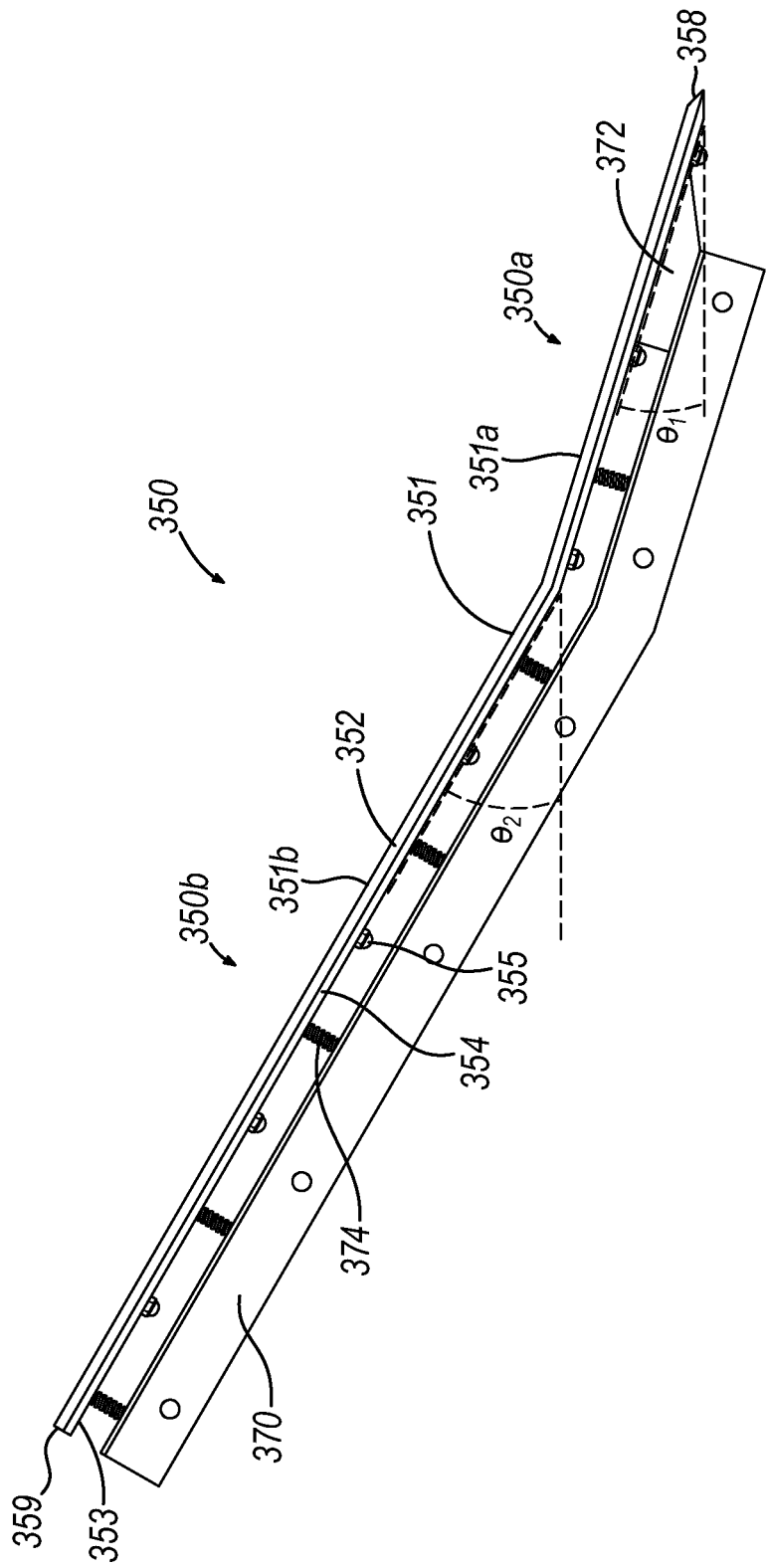
FIG. 10 is a top plan view of another exemplary flexible divert guide for use with the sortation conveyor of FIG. 1.

FIG. 10 shows another exemplary flexible divert guide 350 that may be similar to any one or more of flexible divert guides 50, 150, 250 described above except as otherwise described below. In this regard, flexible divert guide 350 is couplable with divert track 40 at upstream end 44 of divert track 40 and/or downstream end 46 of divert track 40, and is configured to receive pusher elements 30 to thereby guide pusher elements 30 to divert track 40 and/or the spent location. In the illustrated version, flexible divert guide 350 comprises a single-angled rail defining a pusher engagement surface 351 and a mounting surface 353. Pusher engagement surface 351 extends from an upstream end 358 to a downstream end 359 of flexible divert guide 350 and is configured to engage pusher elements 30 (see FIG. 1). A fixation member in the form of a mounting plate 372 extends from a region of mounting surface 353 near upstream end 358 to a single-angled bracket 370 that is configured to couple flexible divert guide 350 with support 60.

In the example shown, the rail includes an upper layer 352 and a lower layer 354 secured to each other via fasteners 355, with pusher engagement surface 351 being presented by upper layer 352 and mounting surface 353 being presented by lower layer 354. In some versions, upper and lower layers 352, 354 may have different stiffnesses from each other. For example, lower layer 354 may have a relatively high stiffness while upper layer 352 may have a relatively low stiffness.

Flexible divert guide 350 further comprises a plurality of resiliently compressible members in the form of coil springs 374 extending from mounting surface 353 to bracket 370. In some versions, flexible divert guide 350 may have a varying stiffness. More particularly, the stiffness of flexible divert guide 350 may vary in the longitudinal direction. For example, an upstream region 350a of flexible divert guide 350 may have a relatively high stiffness while a downstream region 350b of flexible divert guide 350 may have a relatively low stiffness. In this regard, the fixation of mounting surface 353 near upstream end 358 to bracket 370 via mounting plate 372 and the flexible coupling of downstream portions of mounting surface 353 to bracket 370 via coil springs 374 may contribute to the varying stiffness of flexible divert guide 350. In addition, or alternatively, one or more coil springs 374 may have unique spring constants different from those of the other coil springs 374 to contribute to the varying stiffness of flexible divert guide 350. For example, a relatively upstream coil spring 374 may have a relatively large spring constant while a relatively downstream coil spring 374 may have a relatively small spring constant.

In the example shown, pusher engagement surface 351 includes an upstream portion 351a and a downstream portion 351b oriented obliquely relative to each other, such that upstream portion 351a is oriented at a first angle $\theta_1$ relative to the longitudinal direction and downstream portion 351b is oriented at a second angle $\theta_2$ relative to the longitudinal direction. In some versions, first angle $\theta_1$ may be equal to or greater than about 20°. In addition, or alternatively, second angle $\theta_2$ may be equal to or greater than about 30°.

Pusher engagement surface 351 may be configured to transition from the illustrated first configuration corresponding to an uncompressed state of flexible divert guide 350 to a second configuration (not shown) corresponding to a compressed state of flexible divert guide 350 in response to a threshold force being exerted against first surface 351 by pusher element 30 in a manner similar to that described above.

Figure 11:
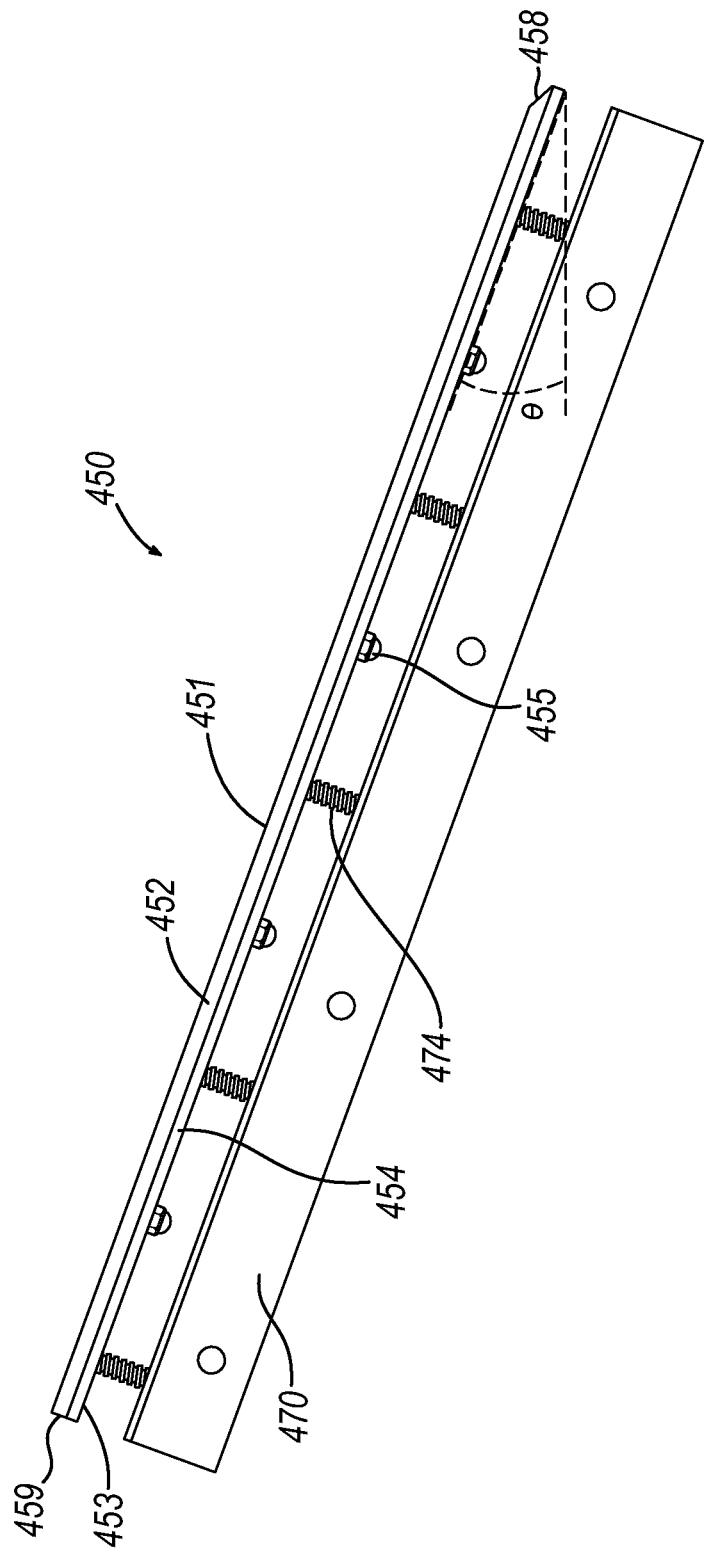
FIG. 11 is a top plan view of another exemplary flexible divert guide for use with the sortation conveyor of FIG. 1.

FIG. 11 shows another exemplary flexible divert guide 450 that may be similar to any one or more of flexible divert guides 50, 150, 250, 350 described above except as otherwise described below. In this regard, flexible divert guide 450 is couplable with divert track 40 at upstream end 44 of divert track 40 and/or downstream end 46 of divert track 40, and is configured to receive pusher elements 30 to thereby guide pusher elements 30 to divert track 40 and/or the spent location. In the illustrated version, flexible divert guide 450 comprises a straight rail defining a pusher engagement surface 451 and a mounting surface 453. Pusher engagement surface 451 extends from an upstream end 458 to a downstream end 459 of flexible divert guide 450 and is configured to engage pusher elements 30 (see FIG. 1).

In the example shown, the rail includes an upper layer 452 and a lower layer 454 secured to each other via fasteners 455, with pusher engagement surface 451 being presented by upper layer 452 and mounting surface 453 being presented by lower layer 454. In some versions, upper and lower layers 452, 454 may have different stiffnesses from each other. For example, lower layer 454 may have a relatively high stiffness while upper layer 452 may have a relatively low stiffness.

Flexible divert guide 450 further comprises a plurality of resiliently compressible members in the form of coil springs 474 extending from mounting surface 453 to a straight bracket 470. In some versions, flexible divert guide 450 may have a varying stiffness. More particularly, the stiffness of flexible divert guide 450 may vary in the longitudinal direction. In this regard, one or more coil springs 474 may have unique spring constants different from those of the other coil springs 474 to contribute to the varying stiffness of flexible divert guide 450. For example, a relatively upstream coil spring 474 may have a relatively large spring constant while a relatively downstream coil spring 474 may have a relatively small spring constant.

In the example shown, pusher engagement surface 451 is oriented at an angle $\theta$ relative to the longitudinal direction. In some versions, angle $\theta$ may be equal to or greater than about 20°.

Pusher engagement surface 451 may be configured to transition from the illustrated first configuration corresponding to an uncompressed state of flexible divert guide 450 to a second configuration (not shown) corresponding to a compressed state of flexible divert guide 450 in response to a threshold force being exerted against first surface 451 by pusher element 30 in a manner similar to that described above.

Figure 12:
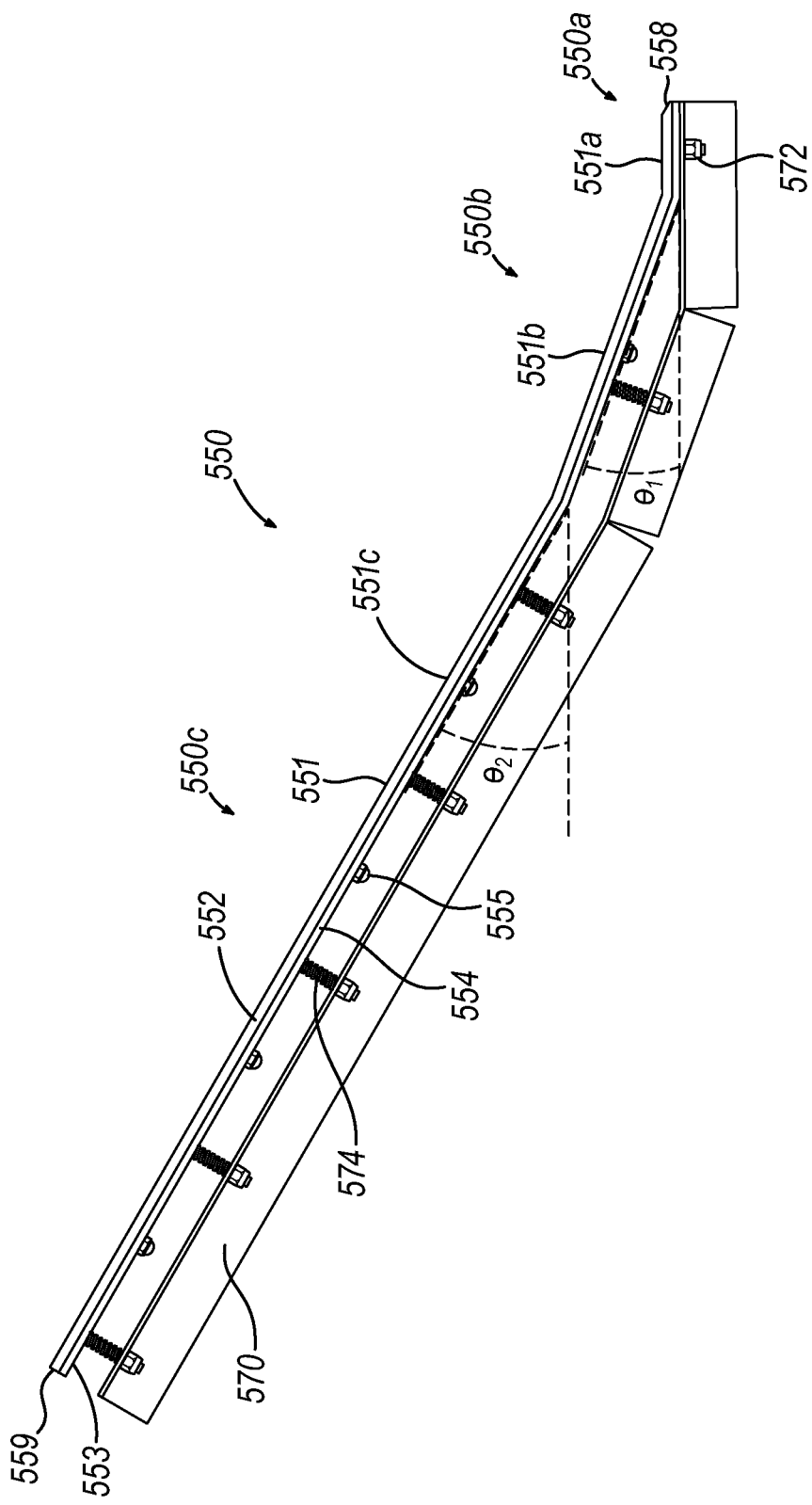
FIG. 12 is a top plan view of another exemplary flexible divert guide for use with the sortation conveyor of FIG. 1.

FIG. 12 shows another exemplary flexible divert guide 550 that may be similar to any one or more of flexible divert guides 50, 150, 250, 350, 450 described above except as otherwise described below. In this regard, flexible divert guide 550 is couplable with divert track 40 at upstream end 44 of divert track 40 and/or downstream end 46 of divert track 40, and is configured to receive pusher elements 30 to thereby guide pusher elements 30 to divert track 40 and/or the spent location. In the illustrated version, flexible divert guide 550 comprises a dual-angled rail defining a pusher engagement surface 551 and a mounting surface 553. Pusher engagement surface 551 extends from an upstream end 558 to a downstream end 559 of flexible divert guide 550 and is configured to engage pusher elements 30 (see FIG. 1). A fixation member in the form of a fastener 572 extends from a region of mounting surface 553 near upstream end 558 to a dual-angled bracket 570 that is configured to couple flexible divert guide 550 with support 60.

In the example shown, the rail includes an upper layer 552 and a lower layer 554 secured to each other via fasteners 555, with pusher engagement surface 551 being presented by upper layer 552 and mounting surface 553 being presented by lower layer 554. In some versions, upper and lower layers 552, 554 may have different stiffnesses from each other. For example, lower layer 554 may have a relatively high stiffness while upper layer 552 may have a relatively low stiffness.

Flexible divert guide 550 further comprises a plurality of resiliently compressible members in the form of coil springs 574 extending from mounting surface 553 to bracket 570. In some versions, flexible divert guide 550 may have a varying stiffness. More particularly, the stiffness of flexible divert guide 550 may vary in the longitudinal direction. For example, an upstream region 550a of flexible divert guide 550 may have a relatively high stiffness while an intermediate region 550b of flexible divert guide 550 may have a relatively low stiffness and/or a downstream region 550c of flexible divert guide 550 may have a relatively even lower stiffness. In this regard, the fixation of mounting surface 553 near upstream end 558 to bracket 570 via fastener 572 and the flexible coupling of downstream portions of mounting surface 553 to bracket 570 via coil springs 574 may contribute to the varying stiffness of flexible divert guide 550. In addition, or alternatively, one or more coil springs 574 may have unique spring constants different from those of the other coil springs 574 to contribute to the varying stiffness of flexible divert guide 550. For example, a relatively upstream coil spring 574 may have a relatively large spring constant while a relatively downstream coil spring 574 may have a relatively small spring constant.

In the example shown, pusher engagement surface 551 includes an upstream portion 551a, an intermediate portion 551b, and a downstream portion 551c oriented obliquely relative to each other, such that upstream portion 551a is oriented parallel relative to the longitudinal direction, intermediate portion 551b is oriented at a first angle $\theta_1$ relative to the longitudinal direction, and downstream portion 551c is oriented at a second angle $\theta_2$ relative to the longitudinal direction. In some versions, first angle $\theta_1$ may be equal to or greater than about 20°. In addition, or alternatively, second angle $\theta_2$ may be equal to or greater than about 30°.

Pusher engagement surface 551 may be configured to transition from the illustrated first configuration corresponding to an uncompressed state of flexible divert guide 550 to a second configuration (not shown) corresponding to a compressed state of flexible divert guide 550 in response to a threshold force being exerted against first surface 551 by pusher element 30 in a manner similar to that described above.

Figure 13:
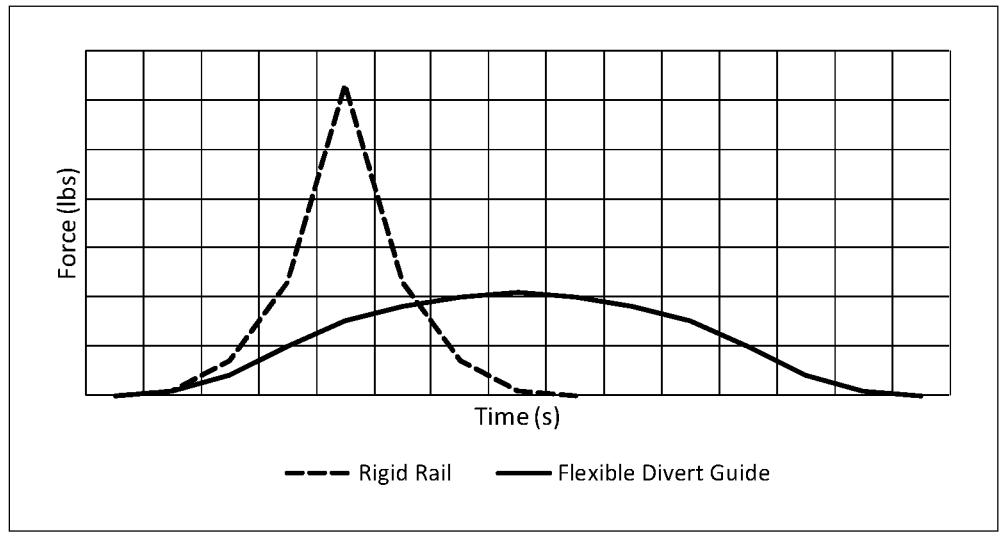
FIG. 13 is a graph depicting illustrative impulse profiles of a pusher element.
Figure 14:
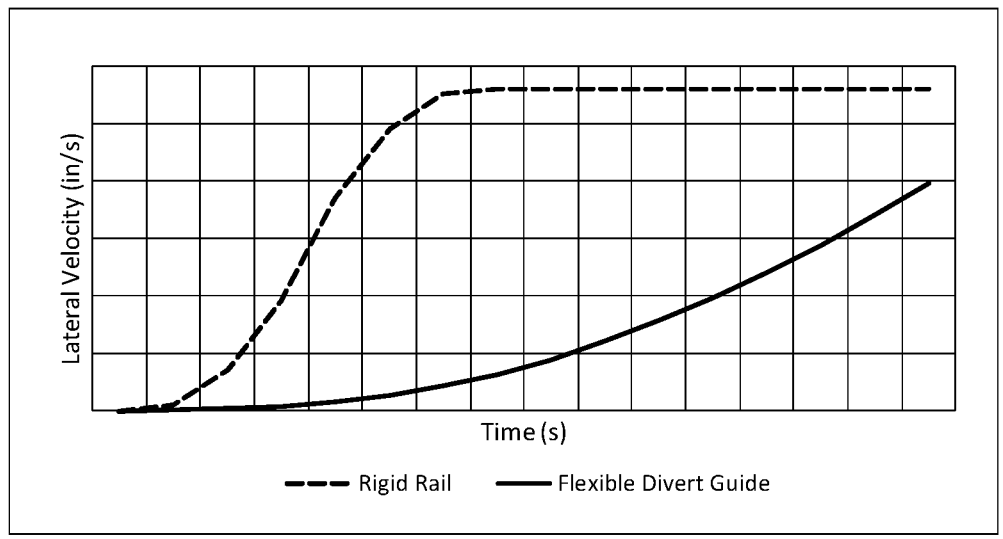
FIG. 14 is a graph depicting illustrative lateral acceleration profiles of a pusher element.

As noted above, the compressibility of any of flexible divert guides 50, 150, 250, 350, 450, 550 may be configured to minimize the change of velocity variable ($\Delta v$) and/or to maximize the time (T) variable to thereby improve the stability of the collision event relative to a rigid or fixed divert track 40. It is noted that, with prior art sortation systems using rigid, arcuate divert guide tracks to laterally accelerate a pusher element 30, relatively large forces are applied between pusher element 30 and article 100 over a relatively short period of time, while the compressibility of any of flexible divert guides 50, 150, 250, 350, 450, 550 may allow for relatively small forces to be applied between pusher element 30 and article 100 over a relatively long period of time. An exemplary comparison between the impulse experienced when using a rigid divert guide track and when using a flexible divert guide 50, 150, 250, 350, 450, 550 is illustrated in FIG. 13. It is also noted that, with prior art sortation systems using such rigid divert guide tracks, pusher element 30 may undergo a relatively abrupt increase in lateral velocity over a relatively short period of time, while the compressibility of any of flexible divert guides 50, 150, 250, 350, 450, 550 may allow for pusher element 30 to undergo a relatively gradual increase in lateral velocity over a relatively long period of time. An exemplary comparison between the lateral acceleration of a pusher element 30 when using a rigid divert guide track and when using a flexible divert guide 50, 150, 250, 350, 450, 550 is illustrated in FIG. 14.

II. Examples

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A sortation conveyor configured to selectively divert articles carried by said sortation conveyor, the sortation conveyor comprising: a first conveying surface extending in a longitudinal direction and defining a first conveying path; a plurality of pusher elements movable along the first conveying surface, each pusher element of said plurality of pusher elements configured to be selectively diverted transversely relative to the longitudinal direction of the first conveying surface so as to engage and divert a selected one of said articles from the first conveying path to a divert conveying path; and a flexible divert guide comprising a surface for engaging a selectively diverted pusher element of said plurality of pusher elements, wherein the flexible divert guide comprises a compressible portion that is configured to compress when the selectively diverted pusher element engages the surface such that the surface is deflected a distance inward when the compressible portion is compressed in response to the selectively diverted pusher element.

Example 2

The sortation conveyor of example 1, wherein the surface of the flexible divert guide for engaging the selectively diverted pusher element of said plurality of pusher elements extends continuously from an upstream end to a downstream end of the flexible divert guide.

Example 3

The sortation conveyor of any one or more of examples 1 through 2, wherein the sortation conveyor comprises a divert track configured to guide the selectively diverted pusher element from the first conveying path to the divert conveying path, wherein the flexible divert guide is couplable with a select one or both of an upstream end and a downstream end of the divert track.

Example 4

The sortation conveyor of example 3, wherein the flexible divert guide is oriented at an angle between 20° and 30° relative to first conveying path.

Example 5

The sortation conveyor of any one or more of examples 1 through 4, wherein the compressible portion of the flexible divert guide comprises an inner core enclosed within an outer core.

Example 6

The sortation conveyor of example 5, wherein the inner core and the outer core comprise a hyperelastic material.

Example 7

The sortation conveyor of any one or more of examples 5 through 6, wherein the inner core comprises one or more openings.

Example 8

The sortation conveyor of any one or more of examples 1 through 7, wherein the distance that flexible divert guide is deflected inward is based on a weight of the selected one of said articles engaged by the selectively diverted pusher element.

Example 9

The sortation conveyor of any one or more of examples 1 through 8, wherein the flexible divert guide is sufficiently resilient such that the surface of flexible divert guide for engaging the selectively diverted pusher element of said plurality of pusher elements is configured to return the distance outward after the compressible portion is compressed in response to the selectively diverted pusher element.

Example 10

The sortation conveyor of any one or more of examples 1 through 9, wherein the flexible divert guide is configured to engage the selectively diverted pusher element without an abrupt force to maintain control of the selectively diverted pusher element.

Example 11

A divert guide for use with a sortation conveyor, wherein the divert guide comprises a compressible portion that compresses when a pusher element of the sortation conveyor engages the flexible divert guide.

Example 12

The flexible divert guide of example 11, wherein the compressible portion comprises an inner core positioned within an outer core.

Example 13

The flexible divert guide of example 12, wherein the inner core and the outer core comprise a hyperelastic material.

Example 14

The flexible divert guide of any one or more of examples 12 through 13, wherein the inner core comprises one or more openings.

Example 15

The flexible divert guide of any one or more of examples 11 through 14, wherein the flexible divert guide comprises a first surface for engaging the pusher element, wherein the first surface is configured to deflect a distance d inwardly in response to the engagement of the pusher element.

Example 16

The flexible divert guide of example 15, wherein the flexible divert guide comprises a second surface couplable with a support and a third surface couplable with a divert track.

Example 17

A method of diverting an article being conveyed on a sortation conveyor from a first conveying path to a divert conveying path, wherein the sortation conveyor comprises a first conveying surface extending in a longitudinal direction, one or more pusher elements, and a flexible divert guide, the method comprising the steps of: moving the one or more pusher elements in the longitudinal direction along the first conveying surface; and diverting the one or more pusher elements across the first conveying surface transversely relative to the longitudinal direction; wherein the one or more pusher elements compress a compressible portion of a flexible divert guide when the one or more pusher elements are diverted.

Example 18

The method of example 17, wherein compressing the compressible portion of the flexible divert guide maintains control of the one or more pusher elements.

Example 19

The method of any one or more of examples 17 through 18, further comprising adjusting a length of the flexible divert guide based on a select one or both of a speed of the sortation conveyor and a weight of the article.

Example 20

The method of any one or more of examples 17 through 19, further comprising adjusting a stiffness of the compressible portion of the flexible divert guide based on a select one or both of a speed of the sortation conveyor and a weight of the article.

Example 21

A sortation conveyor comprising: (a) a conveying surface extending in a longitudinal direction and configured to carry an article along a conveying path; (b) a pusher element configured to be selectively diverted transversely relative to the longitudinal direction for engaging and diverting the article away from the conveying path; and (c) a flexible divert guide including at least one compressible member configured to transition between an uncompressed state and a compressed state.

Example 22

The sortation conveyor of example 21, wherein the flexible divert guide includes a pusher engagement surface configured to selectively engage the pusher element when the pusher element is diverted for guiding the pusher element along at least one guide path, wherein the pusher engagement surface is configured to assume a first configuration when the at least one compressible member is in the uncompressed state, wherein the pusher engagement surface is configured to assume a second configuration when the at least one compressible member is in the compressed state.

Example 23

The sortation conveyor of example 22, wherein the pusher element is configured to transition the at least one compressible member from the uncompressed state to the compressed state during engagement of the pusher element with the pusher engagement surface.

Example 24

The sortation conveyor of example 23, wherein a shape of the pusher engagement surface when the pusher engagement surface is in the second configuration is responsive to a spring constant of the at least one compressible member and a weight of the article.

Example 25

The sortation conveyor of any one or more of examples 23 through 24, wherein a shape of the at least one guide path when the pusher engagement surface is in the second configuration is responsive to a spring constant of the at least one compressible member and a weight of the article.

Example 26

The sortation conveyor of any one or more of examples 21 through 25, wherein the at least one compressible member includes at least one resiliently compressible member.

Example 27

The sortation conveyor of example 26, wherein the at least one resiliently compressible member includes at least one spring.

Example 28

The sortation conveyor of example 26, wherein the at least one resiliently compressible member comprises a composite, flexible material.

Example 29

The sortation conveyor of example 26, wherein the at least one resiliently compressible member comprises a hyperelastic material.

Example 30

The sortation conveyor of any one or more of examples 21 through 29, wherein the flexible divert guide has a varying stiffness in the longitudinal direction.

Example 31

A sortation conveyor comprising: (a) a conveying surface extending in a longitudinal direction and configured to carry an article along a conveying path; (b) a pusher element configured to be selectively diverted transversely relative to the longitudinal direction for engaging and diverting the article away from the conveying path; and (c) a flexible divert guide including a pusher engagement surface configured to selectively engage the pusher element when the pusher element is diverted for guiding the pusher element along at least one guide path.

Example 32

The sortation conveyor of example 31, wherein the pusher engagement surface is configured to transition between a first configuration and a second configuration.

Example 33

The sortation conveyor of example 32, wherein the flexible divert guide includes at least one compressible member configured to transition between an uncompressed state and a compressed state, wherein the pusher engagement surface is configured to assume the first configuration when the at least one compressible member is in the uncompressed state, wherein the pusher engagement surface is configured to assume the second configuration when the at least one compressible member is in the compressed state.

Example 34

The sortation conveyor of any one or more of examples 32 through 33, wherein the pusher engagement surface defines a first guide path when the pusher engagement surface is in the first configuration, wherein the pusher engagement surface defines a second guide path when the pusher engagement surface is in the second configuration.

Example 35

The sortation conveyor of any one or more of examples 32 through 34, wherein the pusher engagement surface is curved at least when the pusher engagement surface is in the second configuration.

Example 36

The sortation conveyor of any one or more of examples 33 through 35, wherein the at least one compressible member includes at least one resiliently compressible member.

Example 37

A method of operating a sortation conveyor comprising (i) a conveying surface extending in a longitudinal direction and configured to carry an article along a conveying path, (ii) a pusher element selectively movable across the conveying surface, and (iii) a flexible divert guide, the method comprising: (a) diverting the pusher element transversely relative to the longitudinal direction; and (b) engaging the pusher element with a pusher engagement surface of the flexible divert guide.

Example 38

The method of example 37, wherein engaging the pusher element with the pusher engagement surface includes transitioning the pusher engagement surface from a first configuration to a second configuration.

Example 39

The method of example 38, wherein engaging the pusher element with the pusher engagement surface includes transitioning the flexible divert guide from an uncompressed state to a compressed state.

Example 40

The method of any one or more of examples 37 through 39, further comprising engaging the pusher element with the article to divert the article away from the conveying path.

Having shown and described various embodiments of the present innovation, further adaptations of the methods and systems described herein may be accomplished by appropriate modifications by one of ordinary skill in the art without departing from the scope of the present innovation. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present innovation should be considered in terms of the following claims and is understood not to be limited to the details of structure and operation shown and described in the specification and drawings.

What is claimed is:

1. A sortation conveyor comprising:
   (a) a divert location including a first position and a second position, wherein the second position is spaced downstream from the first position;
   (b) a conveying surface extending along the divert location in a longitudinal direction from an upstream position toward a downstream position and configured to carry an article downstream along a conveying path;
   (c) a pusher element configured to be selectively diverted transversely relative to the longitudinal direction at the first position, wherein the pusher element is further configured to engage the article at the second position downstream of the first position for diverting the article away from the conveying path downstream of the second position; and
   (d) a flexible divert guide including at least one compressible member positioned downstream of the first position at the second position, wherein the at least one compressible member is configured to transition between an uncompressed state and a compressed state.

2. The sortation conveyor of claim 1, wherein the flexible divert guide includes a pusher engagement surface configured to selectively engage the pusher element when the pusher element is diverted for guiding the pusher element along at least one guide path, wherein the pusher engagement surface is configured to assume a first configuration when the at least one compressible member is in the uncompressed state, wherein the pusher engagement surface is configured to assume a second configuration when the at least one compressible member is in the compressed state.

3. The sortation conveyor of claim 2, wherein the pusher element is configured to transition the at least one compressible member from the uncompressed state to the compressed state during engagement of the pusher element with the pusher engagement surface.

4. The sortation conveyor of claim 3, wherein a shape of the pusher engagement surface when the pusher engagement surface is in the second configuration is responsive to a spring constant of the at least one compressible member and a weight of the article.

5. The sortation conveyor of claim 3, wherein a shape of the at least one guide path when the pusher engagement surface is in the second configuration is responsive to a spring constant of the at least one compressible member and a weight of the article.

6. The sortation conveyor of claim 1, wherein the at least one compressible member includes at least one resiliently compressible member.

7. The sortation conveyor of claim 6, wherein the at least one resiliently compressible member includes at least one spring.

8. The sortation conveyor of claim 6, wherein the at least one resiliently compressible member comprises a composite, flexible material.

9. The sortation conveyor of claim 6, wherein the at least one resiliently compressible member comprises a hyperelastic material.

10. The sortation conveyor of claim 1, wherein the flexible divert guide has a varying stiffness in the longitudinal direction.

11. A sortation conveyor comprising:
   (a) a divert location including a first position and a second position, wherein the second position is spaced downstream from the first position;
   (b) a conveying surface extending in a longitudinal direction from an upstream position toward a downstream position and configured to carry an article downstream along a conveying path;
   (c) a pusher element configured to be selectively diverted transversely relative to the longitudinal direction at the first position, wherein the pusher element is further configured to engage the article at the second position downstream of the first position for diverting the article away from the conveying path downstream of the second position; and
   (d) a flexible divert guide including a pusher engagement surface positioned downstream of the first position at the second position, wherein the pusher engagement surface is configured to selectively engage the pusher element when the pusher element is diverted for guiding the pusher element along at least one guide path.

12. The sortation conveyor of claim 11, wherein the pusher engagement surface is configured to transition between a first configuration and a second configuration.

13. The sortation conveyor of claim 12, wherein the flexible divert guide includes at least one compressible member configured to transition between an uncompressed state and a compressed state, wherein the pusher engagement surface is configured to assume the first configuration when the at least one compressible member is in the uncompressed state, wherein the pusher engagement surface is configured to assume the second configuration when the at least one compressible member is in the compressed state.

14. The sortation conveyor of claim 12, wherein the pusher engagement surface defines a first guide path when the pusher engagement surface is in the first configuration, wherein the pusher engagement surface defines a second guide path when the pusher engagement surface is in the second configuration.

15. The sortation conveyor of claim 12, wherein the pusher engagement surface is curved at least when the pusher engagement surface is in the second configuration.

16. The sortation conveyor of claim 13, wherein the at least one compressible member includes at least one resiliently compressible member.

17. A method of operating a sortation conveyor comprising (i) a conveying surface extending in a longitudinal direction from an upstream position toward a downstream position and configured to carry an article downstream along a conveying path, (ii) a pusher element selectively movable across the conveying surface, and (iii) a flexible divert guide, the method comprising:
(a) diverting the pusher element transversely relative to the longitudinal direction at a first position of a divert location;
(b) engaging the pusher element with the article at a second position of the divert location downstream of the first position; and
(c) engaging the pusher element with a pusher engagement surface of the flexible divert guide at the second position downstream of the first position.

18. The method of claim 17, wherein engaging the pusher element with the pusher engagement surface includes transitioning the pusher engagement surface from a first configuration to a second configuration.

19. The method of claim 18, wherein engaging the pusher element with the pusher engagement surface includes transitioning the flexible divert guide from an uncompressed state to a compressed state.

20. The method of claim 17, further comprising engaging the pusher element with the article to divert the article away from the conveying path.

21. A sortation conveyor comprising:
(a) a conveying surface extending in a longitudinal direction and configured to carry an article along a conveying path;
(b) a pusher element configured to be selectively diverted transversely relative to the longitudinal direction for engaging and diverting the article away from the conveying path; and
(c) a flexible divert guide including at least one compressible member configured to transition between an uncompressed state and a compressed state, wherein the flexible divert guide has a varying stiffness in the longitudinal direction.

22. A sortation conveyor comprising:
(a) a conveying surface extending in a longitudinal direction and configured to carry an article along a conveying path;
(b) a pusher element configured to be selectively diverted transversely relative to the longitudinal direction for engaging and diverting the article away from the conveying path; and
(c) a flexible divert guide including a pusher engagement surface configured to selectively engage the pusher element when the pusher element is diverted for guiding the pusher element along at least one guide path, wherein the pusher engagement surface is configured to transition between a first configuration and a second configuration, and wherein the pusher engagement surface is curved at least when the pusher engagement surface is in the second configuration.

* * * * *